United States Patent
Taherzadeh Boroujeni et al.

(10) Patent No.: US 12,058,653 B2
(45) Date of Patent: *Aug. 6, 2024

(54) DYNAMIC UPLINK TRANSMISSION ADAPTATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,901

(22) Filed: Apr. 10, 2023

(65) Prior Publication Data
US 2023/0247594 A1    Aug. 3, 2023

Related U.S. Application Data

(63) Continuation of application No. 17/118,123, filed on Dec. 10, 2020, now Pat. No. 11,627,569.

(60) Provisional application No. 62/949,412, filed on Dec. 17, 2019.

(51) Int. Cl.
*H04W 72/044* (2023.01)
*H04W 72/23* (2023.01)
*H04W 72/541* (2023.01)

(52) U.S. Cl.
CPC ......... *H04W 72/044* (2013.01); *H04W 72/23* (2023.01); *H04W 72/541* (2023.01)

(58) Field of Classification Search
CPC .............. H04W 72/044; H04W 72/23; H04W 72/541
See application file for complete search history.

(56) References Cited

U.S. PATENT DOCUMENTS

| | | | |
|---|---|---|---|
| 11,627,569 B2* | 4/2023 | Taherzadeh Boroujeni | H04W 72/23 370/330 |
| 2006/0291393 A1 | 12/2006 | Teague et al. | |
| 2010/0040027 A1* | 2/2010 | Camp, Jr. | H04W 72/02 370/335 |
| 2014/0247795 A1* | 9/2014 | Kim | H04W 72/04 370/329 |
| 2017/0150503 A1* | 5/2017 | Fukuta | H04L 5/0048 |
| 2018/0115387 A1* | 4/2018 | Takeda | H04L 1/0003 |
| 2018/0317213 A1* | 11/2018 | Islam | H04L 1/1819 |
| 2019/0132862 A1* | 5/2019 | Jeon | H04L 5/0098 |

* cited by examiner

*Primary Examiner* — Maharishi V Khirodhar
*Assistant Examiner* — Kenneth P Hunt
(74) *Attorney, Agent, or Firm* — Harrity & Harrity, LLP/QUALCOMM Incorporated

(57) ABSTRACT

Various aspects of the present disclosure generally relate to wireless communication. In some aspects, a base station may transmit, to a user equipment, an indication of a temporary resource change, wherein the temporary resource change is associated with at least one of a resource configuration, a repetition configuration, or a combination thereof. Numerous other aspects are provided.

45 Claims, 13 Drawing Sheets

DYNAMIC UPLINK TRANSMISSION ADAPTATION

CROSS-REFERENCE TO RELATED APPLICATION

This Patent Application is a continuation of U.S. patent application Ser. No. 17/118,123, filed on Dec. 10, 2020, entitled "DYNAMIC UPLINK TRANSMISSION ADAPTATION" (now U.S. Pat. No. 11,627,569), which claims priority to U.S. Provisional Patent Application No. 62/949,412, filed on Dec. 17, 2019, entitled "DYNAMIC UPLINK TRANSMISSION ADAPTATION," and assigned to the assignee hereof. The disclosure of the prior Applications is considered part of and is incorporated by reference into this Patent Application.

INTRODUCTION

Aspects of the present disclosure generally relate to wireless communication and to techniques and apparatuses for temporary alteration to an uplink transmission configuration.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, a combination thereof, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BS s) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, a combination thereof, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a base station (BS) includes transmitting, to a user equipment (UE), an indication of a temporary resource change, wherein the temporary resource change is associated with at least one of a resource configuration, a repetition configuration, or a combination thereof; and receiving, from the UE, an uplink transmission in accordance with the temporary resource change.

In some aspects, a method of wireless communication performed by a UE includes receiving, from a BS, an indication of a temporary resource change, wherein the temporary resource change is associated with at least one of a resource configuration, a repetition configuration, or a combination thereof; and transmitting, to the BS, an uplink transmission in accordance with the temporary resource change.

In some aspects, a BS for wireless communication includes a memory and one or more processors coupled to the memory, the memory and the one or more processors configured to: transmit, to a UE, an indication of a temporary resource change, wherein the temporary resource change is associated with at least one of a resource configuration, a repetition configuration, or a combination thereof; and receive, from the UE, an uplink transmission in accordance with the temporary resource change.

In some aspects, a UE for wireless communication includes a memory and one or more processors coupled to the memory, the memory and the one or more processors configured to: receive, from a BS, an indication of a temporary resource change, wherein the temporary resource change is associated with at least one of a resource configuration, a repetition configuration, or a combination thereof; and transmit, to the BS, an uplink transmission in accordance with the temporary resource change.

In some aspects, a non-transitory computer-readable medium storing a set of instructions for wireless communication includes one or more instructions that, when executed by one or more processors of a BS, cause the BS to: transmit, to a UE, an indication of a temporary resource change, wherein the temporary resource change is associated with at least one of a resource configuration, a repetition configuration, or a combination thereof; and receive, from the UE, an uplink transmission in accordance with the temporary resource change.

In some aspects, a non-transitory computer-readable medium storing a set of instructions for wireless communication includes one or more instructions that, when executed by one or more processors of an UE, cause the UE to: receive, from a BS, an indication of a temporary resource change, wherein the temporary resource change is associated with at least one of a resource configuration, a repetition configuration, or a combination thereof; and transmit, to the BS, an uplink transmission in accordance with the temporary resource change.

In some aspects, an apparatus for wireless communication includes means for transmitting, to a UE, an indication of a temporary resource change, wherein the temporary resource change is associated with at least one of a resource configuration, a repetition configuration, or a combination thereof; and means for receiving, from the UE, an uplink transmission in accordance with the temporary resource change.

In some aspects, an apparatus for wireless communication includes means for receiving, from a BS, an indication of a temporary resource change, wherein the temporary resource change is associated with at least one of a resource configuration, a repetition configuration, or a combination thereof; and means for transmitting, to the BS, an uplink transmission in accordance with the temporary resource change.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
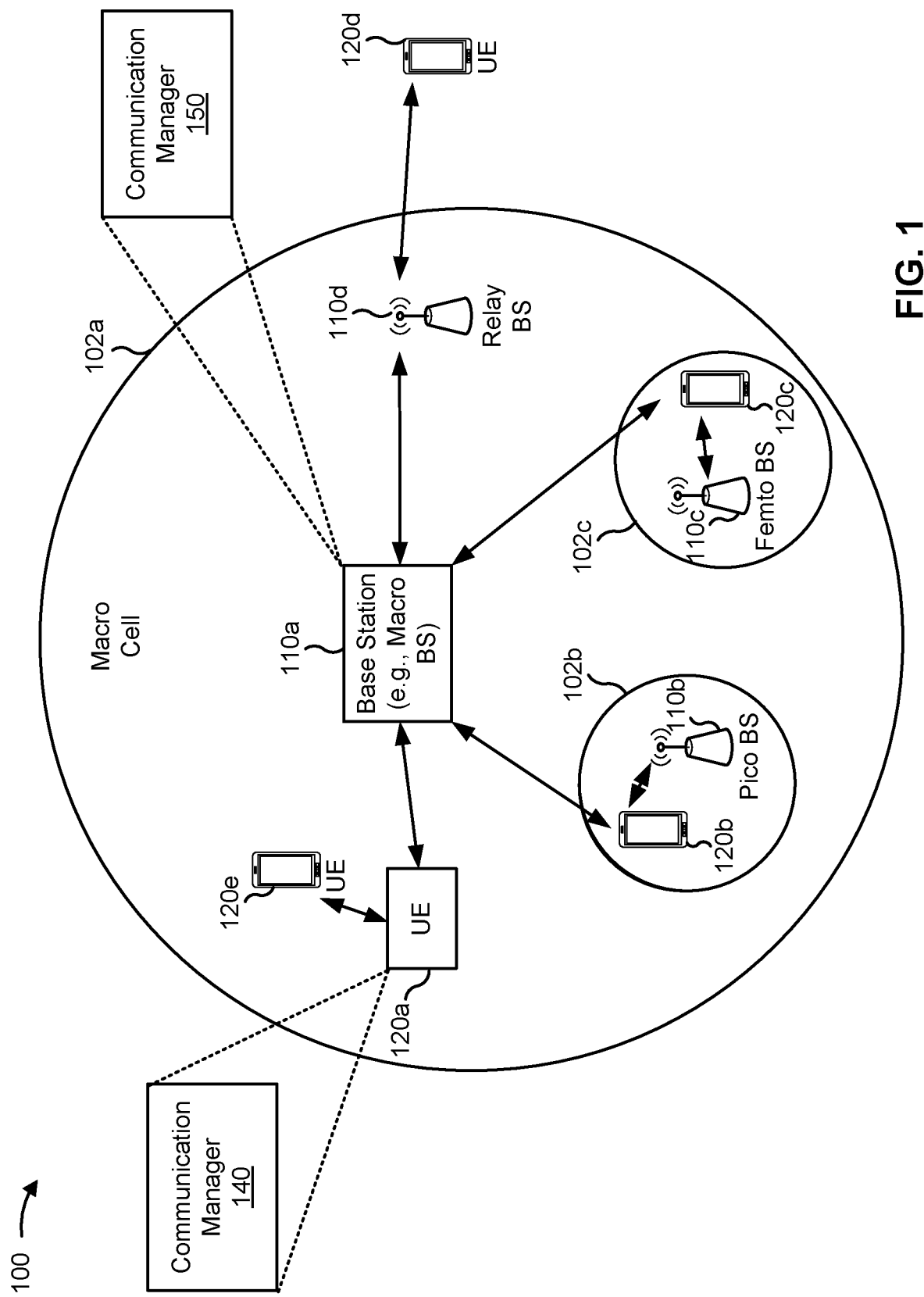
FIG. 1 is a block diagram illustrating an example of a wireless communication network, in accordance with various aspects of the present disclosure.

In some communications systems, such as 5G with time division duplexing (TDD), base stations (BSs) may provide neighboring cells that are independently scheduled. For example, a first BS may provide and schedule a first cell and a second BS may provide and schedule a second cell. When a plurality of cells are neighbor cells (e.g., the cells are deployed within a common area, such as approximately the same geographic area, in the same building, or otherwise such that coverage of the plurality cells overlaps or is within a threshold proximity of other cells within the plurality of cells, among other examples), the plurality of cells may cause some amount of interference. For example, some transmissions in the first cell may interference with other transmissions in the second cell.

When cells are independently scheduled, the level of interference may differ across slots. For example, in a first slot, uplink transmissions in a first cell may experience a first level of cross-link interference from transmissions in a second cell as a result of respective scheduling in the first cell and the second cell. Further, in a second slot, uplink transmissions in the first cell may experience a second level of cross-link interference from transmissions in the second cell as a result of respective scheduling in the first cell and the second cell.

Some techniques enable adaptation of uplink transmissions using static signaling. For example, the first BS may transmit a command to cause a first UE to use repetition for uplink transmissions to account for the cross-link interference. Because the level of cross-link interference changes, the command may be appropriate to account for cross-link interference at some times.

Some aspects described herein enable dynamic uplink transmission adaptation. For example, a BS may configure a temporary resource change, which may include time resources, frequency resources, a repetition configuration, a combination thereof, and/or the like for a UE to use during an occurrence of temporary cross-link interference. After detecting the occurrence of temporary cross-link interference, the BS may transmit a command to cause the UE to use the configured time resources, frequency resources, repetition configuration, a combination thereof, and/or the like. In one or more examples, the BS may cause the temporary resource change to expire after a configured period of time.

In this way, the BS provides additional resources to enable the UE to adapt to a threshold level of cross-link interference. Further, the UE may avoid using the additional resources after the level of cross-link interference has changed (e.g., to less than the threshold level in another slot, after a configured quantity of symbols, a combination thereof, and/or the like). In this way, the BS and the UE use dynamic adaptation to reduce a utilization of network resources by avoiding using additional resources after the change to the level of cross-link interference.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, a combination thereof, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, a combination thereof, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), a combination thereof, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, a combination thereof, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, a combination thereof, and/or the like.

Wireless network 100 may be a heterogeneous network that includes BSs of different types, e.g., macro BSs, pico BSs, femto BSs, relay BSs, a combination thereof, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, a combination thereof, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, a combination thereof, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, a combination thereof, and/or the like.

In general, any number of wireless networks may be deployed in a given geographic area. Each wireless network may support a particular RAT and may operate on one or more frequencies. A RAT may also be referred to as a radio technology, an air interface, a combination thereof, and/or the like. A frequency may also be referred to as a carrier, a frequency channel, a combination thereof, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may set a temporary resource change, receive an indicator of the temporary resource change based at least in part on a detection of a threshold level of cross-link interference, transmit one or more uplink transmissions before an expiration for the temporary resource change using the temporary resource change, return to a different configuration after the expiration of the occurrence of temporary cross-link interference, a combination thereof, and/or the like. Additionally, or alternatively, the communication manager 140 may perform one or more other operations described herein.

Similarly, the base station 110 may include a communication manager 150. As described in more detail elsewhere herein, the communication manager 150 may set a temporary resource change, detect a threshold level of cross-link interference for a first uplink transmission by a UE, and transmit, to the UE to use for a second uplink transmission, an indicator of the temporary resource change based at least in part on detecting the threshold level of cross-link interference. Additionally, or alternatively, the communication manager 150 may perform one or more other operations described herein.

As indicated above, FIG. 1 is provided merely as an example. Other examples may differ from what is described with regard to FIG. 1.

Figure 2:
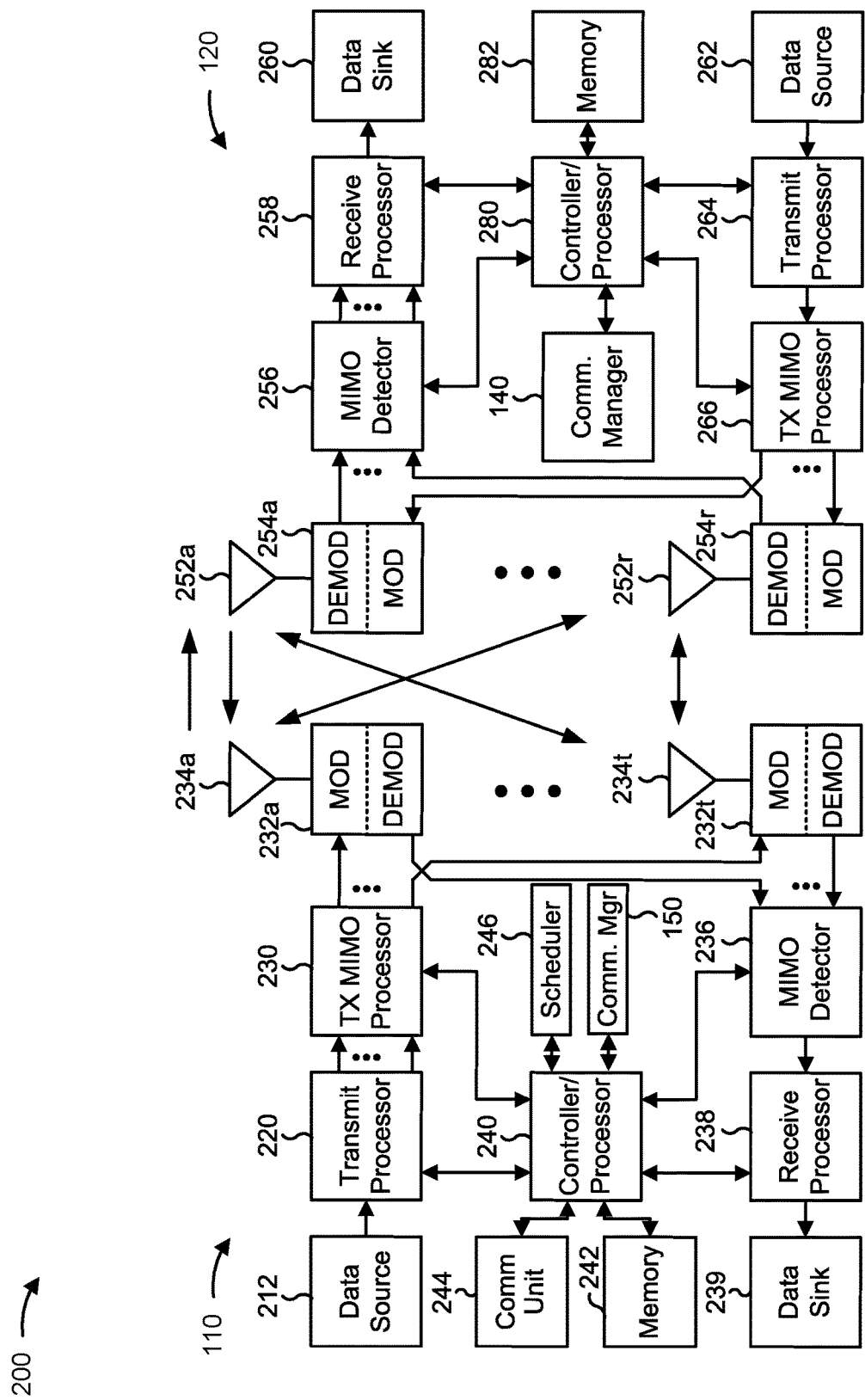
FIG. 2 is a block diagram illustrating an example of a base station in communication with a UE in a wireless communication network, in accordance with various aspects of the present disclosure.

FIG. 2 shows a block diagram of a design 200 of base station 110 (e.g., base station 110a) and UE 120 (e.g., UE 120a), which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), a combination thereof, and/or the like) and control information (e.g., CQI requests, grants, upper layer signaling, a combination thereof, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), a combination thereof, and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, a combination thereof, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, a combination thereof, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to a network controller via communication unit 244.

Controller/processor 240 of base station 110, controller/processor 280 of UE 120, and/or any other component(s) of FIG. 2 may perform one or more techniques associated with dynamic uplink transmission adaptation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, a BS includes means for transmitting, to a UE, an indication of a temporary resource change, wherein the temporary resource change is associated with at least one of a resource configuration, a repetition configuration, or a combination thereof; and/or means for receiving, from the UE, an uplink transmission in accordance with the temporary resource change. The means for the BS to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, a UE includes means for receiving, from a BS, an indication of a temporary resource change, wherein the temporary resource change is associated with at least one of a resource configuration, a repetition configuration, or a combination thereof; and/or means for transmitting, to the BS, an uplink transmission in accordance with the temporary resource change. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided merely as an example. Other examples may differ from what is described with regard to FIG. 2.

Figure 3:
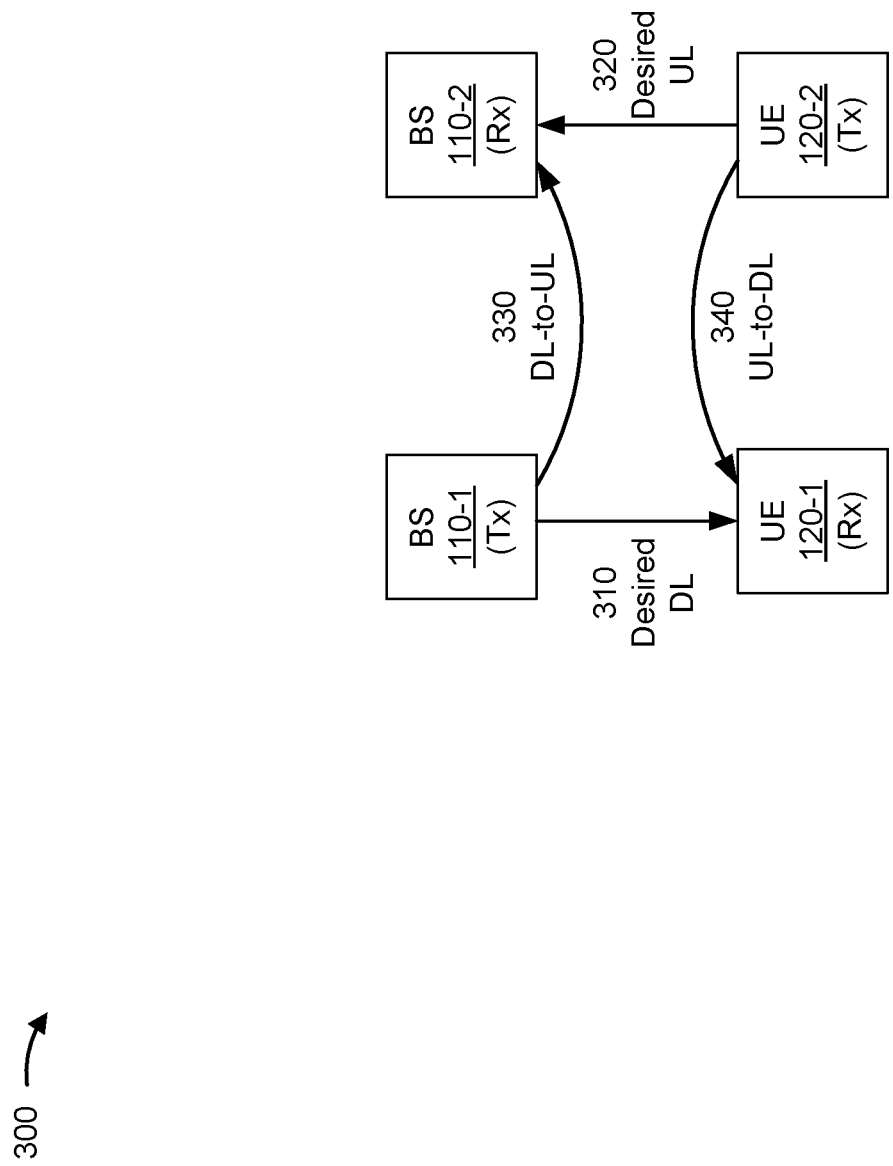
FIG. 3 is a diagram illustrating an example of cross-link interference detection and mitigation, in accordance with various aspects of the present disclosure.

FIG. 3 is a diagram illustrating an example 300 relating to cross-link interference detection and mitigation, in accordance with various aspects of the present disclosure.

In dynamic time division duplexing (TDD), the allocation of network resources to uplink and downlink may be dynamically modified depending on a traffic load. For example, a base station 110 may configure a TDD configuration (e.g., a TDD pattern) with more uplink transmission time intervals (TTIs) (e.g., frames, subframes, slots, minislots, symbols, and/or the like) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the base station 110 and the UE 120.

As shown in FIG. 3, when neighboring base stations 110 use different TDD configurations to communicate with UEs 120, this may result in a downlink communication 310 between a first base station 110-1 and a first UE 120-1 in a same TTI as an uplink communication 320 between a second base station 110-2 and a second UE 120-2. These communications in different transmission directions (e.g., downlink vs. uplink) in the same TTI may interfere with one another, which may be referred to as cross-link interference.

For example, as shown by reference number 330, the downlink communication 310 transmitted by the first base station 110-1 may be received by the second base station 110-2, and may interfere with reception, by the second base station 110-2, of the uplink communication 320 from the second UE 120-2. This may be referred to as downlink-to-uplink (DL-to-UL) interference, base station to base station interference, gNB to gNB interference, and/or the like.

Further, as shown by reference number 340, the uplink communication 320 transmitted by the second UE 120-2 may be received by the first UE 120-1, and may interfere with reception, by the first UE 120-1, of the downlink communication 310 from the first base station 110-1. This may be referred to as uplink-to-downlink (UL-to-DL) interference, UE to UE interference, and/or the like. This UE to UE interference may occur and/or may increase when the first UE 120-1 and the second UE 120-2 are in close proximity, and may be avoided or mitigated by preventing scheduling of the UEs 120 in different transmission directions in the same TTI.

As indicated above, FIG. 3 is provided as an example. Other examples are possible and may differ from what was described with respect to FIG. 3.

Figure 4:
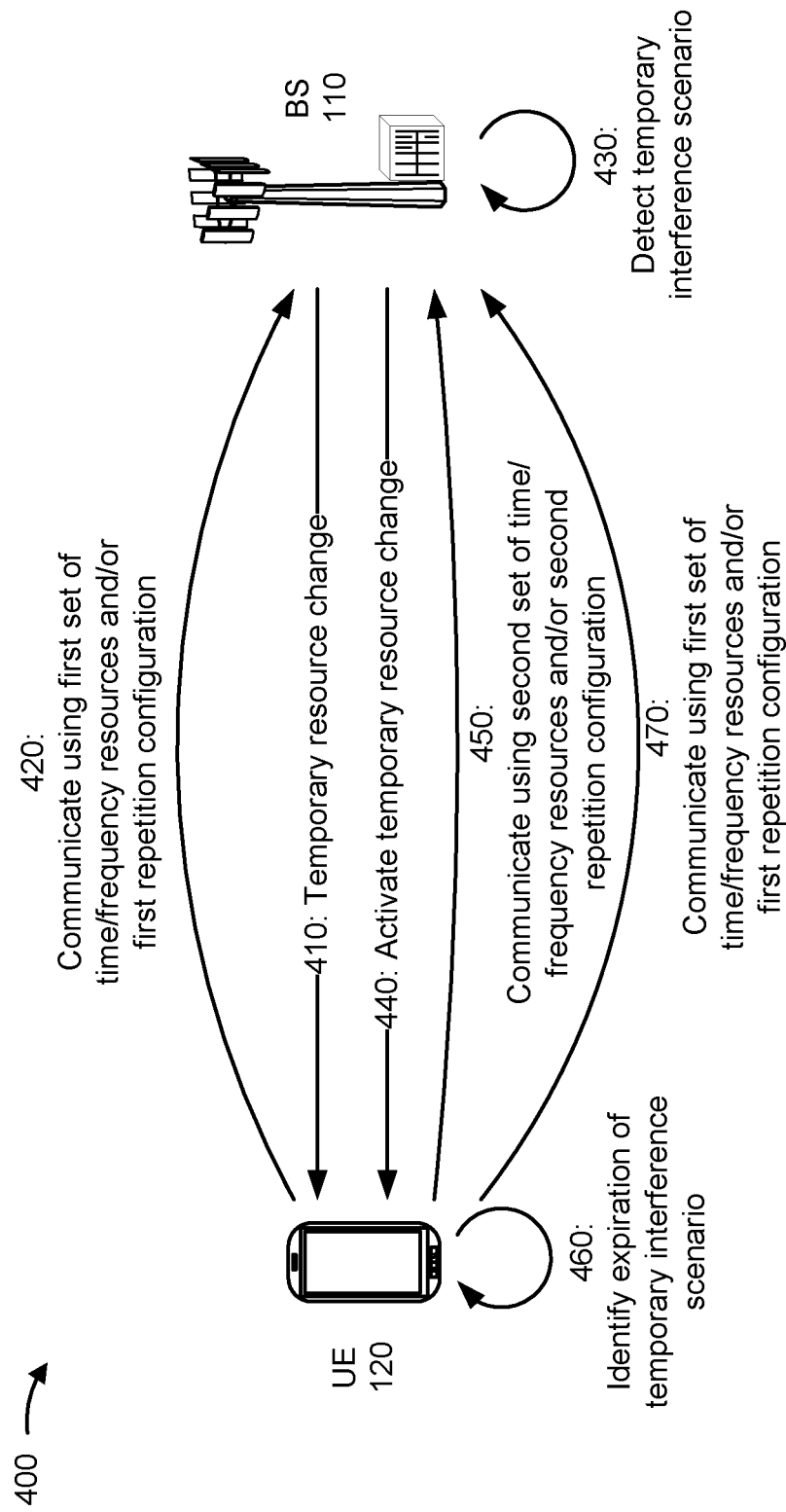
FIG. 4 is a diagram illustrating an example of dynamic uplink transmission adaptation, in accordance with various aspects of the present disclosure.

FIG. 4 is a diagram illustrating an example 400 of dynamic uplink transmission adaptation, in accordance with various aspects of the present disclosure. As shown in FIG. 4, example 400 includes a BS 110 (e.g., BS 110a) and a UE 120 (e.g., UE 120a).

As further shown in FIG. 4, and by reference number 410, BS 110 may configure a temporary resource change for UE 120. For example, BS 110 may identify one or more additional time resources (e.g., additional to time resources already allocated to UE 120) in which UE 120 may transmit when BS 110 detects an occurrence of temporary cross-link interference. Additionally, or alternatively, BS 110 may identify one or more additional frequency resources in which UE 120 may transmit when BS 110 detects the occurrence of temporary cross-link interference. Additionally, or alternatively, BS 110 may determine a repetition configuration that UE 120 is to use when BS 110 detects the occurrence of temporary cross-link interference, such as a quantity of repetitions to transmit of an uplink transmission, which uplink transmissions are to be subject to transmission repetition, a combination thereof, and/or the like.

In one or more examples, BS 110 may provide information identifying the temporary resource change to UE 120 to enable UE 120 to use the temporary resource change when BS 110 detects an occurrence of temporary cross-link interference. For example, BS 110 may use radio resource control (RRC) signaling to provide an indicator of the temporary resource change or an indicator of an expiration thereof, as described in more detail herein. In some aspects, BS 110 may provide, via RRC signaling, information identifying a plurality of possible temporary resource changes (e.g., a plurality of possible additional time and/or frequency resources) from which UE 120 may select a particular temporary resource change to use, as described in more detail herein.

Additionally, or alternatively, BS 110 may provide the information identifying the temporary resource change to UE 120 when BS 110 detects the temporary resource change. For example, BS 110 may provide a downlink control information (DCI), such as a UE-specific DCI or a group-common DCI, to identify the temporary resource change at a time when UE 120 is to use the temporary resource change. Additionally, or alternatively, BS 110 may provide a medium access control (MAC) control element (CE) to identify the temporary resource change. As shown by reference number 420, before BS 110 detects the occurrence of temporary cross-link interference, UE 120 may communicate with BS 110 using a first set of time and/or frequency resources and/or using a first repetition configuration. For example, UE 120 may transmit one or more first uplink transmissions to BS 110.

As further shown in FIG. 4, and by reference numbers 430 and 440, BS 110 may detect an occurrence of temporary cross-link interference and may cause UE 120 to use the temporary resource change for communication. For example, BS 110 may determine that, for a cell that includes UE 120, a level of cross-link interference relating to transmissions from another cell satisfies a threshold. In one or more examples, BS 110 may determine that cross-link interference relating to transmissions from the other cell is temporary, as described above, as a result of independent scheduling by BS 110 and another BS providing the other cell.

As a result, BS 110 may determine to cause UE 120 to activate the temporary resource change. For example, BS 110 may transmit an indicator of the temporary resource change to cause UE 120 to use the additional time resources, the additional frequency resources, the repetition configuration, a combination thereof, and/or the like of the temporary resource change. In one or more examples, the indicator may include an activation signal to indicate that UE 120 is to use a temporary resource change that was previously signaled to UE 120. Additionally, or alternatively, the indicator may include information identifying a temporary resource change. Additionally, or alternatively, the indicator may include information to enable UE 120 to select a temporary resource change from a plurality of previously signaled temporary resource changes. In one or more examples, the indicator may be a DCI (e.g., a UE-specific DCI or a group-common DCI), a MAC CE, a combination thereof, and/or the like.

In some aspects, BS 110 may provide information identifying when the temporary resource change is to expire. For example, BS 110 may instruct UE 120 to use the temporary resource change for a threshold amount of time. Additionally, or alternatively, BS 110 may instruct UE 120 to use the temporary resource change for a threshold quantity of slots, symbols, a combination thereof, and/or the like. In some aspects, UE 120 may store information identifying when the expiration of the temporary resource change is to occur, such as based on a previous signal, based on a standard-defined configuration, a combination thereof, and/or the like.

As further shown in FIG. 4, and by reference number 450, UE 120 may communicate using a second set of time and/or frequency resources and/or a second repetition configuration of the temporary resource change. For example, UE 120 may transmit one or more second uplink transmissions to BS 110 using the temporary resource change. In one or more examples, after a threshold period of time, a threshold quantity of slots or symbols, a combination thereof, and/or the like, UE 120 may expire the temporary resource change, as shown by reference number 460. For example, UE 120 may return to communicating with BS 110 using the first set of time and/or frequency resources and/or the first repetition configuration, as shown by reference number 470.

As indicated above, FIG. 4 is provided as an example. Other examples may differ from what is described with respect to FIG. 4.

Figure 5:
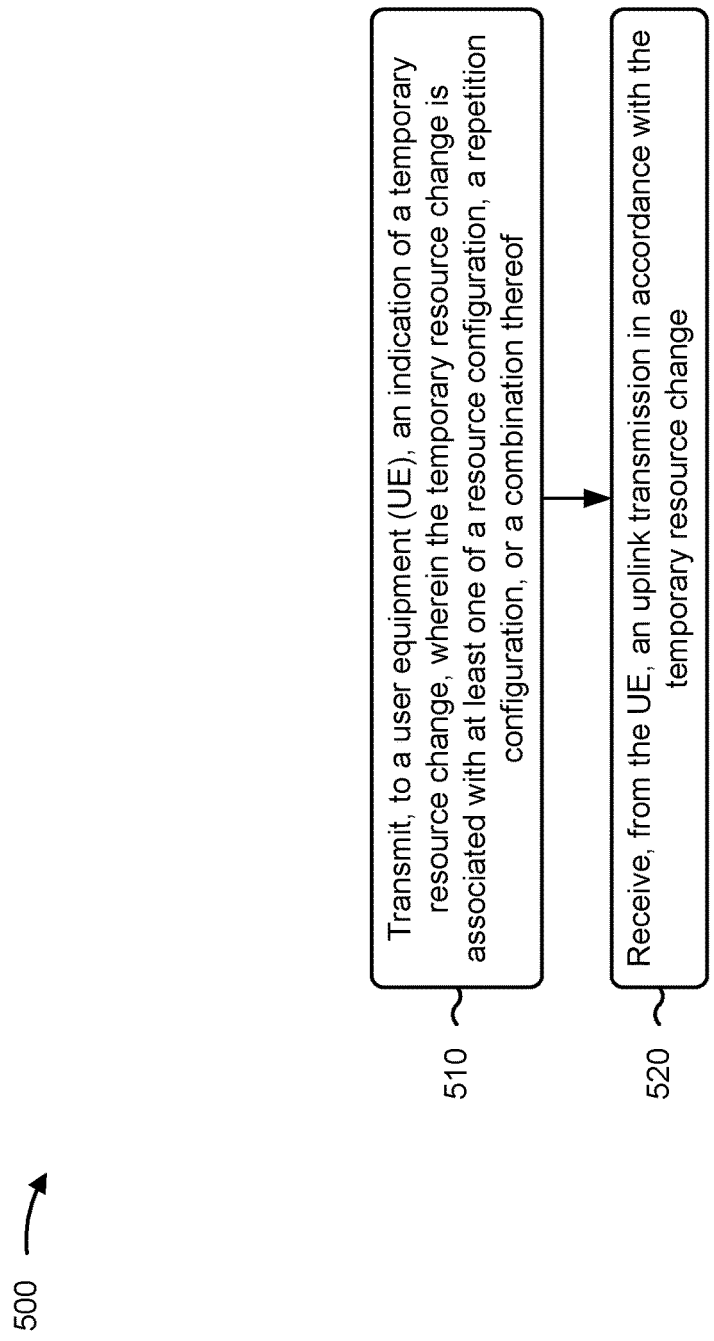
FIG. 5 is a diagram illustrating an example process performed, for example, by a base station, in accordance with various aspects of the present disclosure.

FIG. 5 is a diagram illustrating an example process 500 performed, for example, by a base station (BS), in accordance with various aspects of the present disclosure. Example process 500 is an example where the BS (e.g., BS 110) performs operations associated with dynamic uplink adaptation.

As shown in FIG. 5, in some aspects, process 500 may include transmitting, to a UE, an indication of a temporary resource change, wherein the temporary resource change is associated with at least one of a resource configuration, a repetition configuration, or a combination thereof (block 510). For example, the BS (e.g., using transmission component 704, depicted in FIG. 7) may transmit, to a UE, an indication of a temporary resource change, wherein the temporary resource change is associated with at least one of a resource configuration, a repetition configuration, or a combination thereof, as described above.

As further shown in FIG. 5, in some aspects, process 500 may include receiving, from the UE, an uplink transmission in accordance with the temporary resource change (block 520). For example, the BS (e.g., using reception component 702, depicted in FIG. 7) may receive, from the UE, an uplink transmission in accordance with the temporary resource change, as described above.

Process 500 may include additional aspects, such as any single aspect or any combination of aspects described below and/or in connection with one or more other processes described elsewhere herein.

In a first aspect, the temporary resource change is the resource configuration.

In a second aspect, alone or in combination with the first aspect, the temporary resource change is the repetition configuration.

In a third aspect, alone or in combination with one or more of the first and second aspects, the temporary resource change is associated with a temporary, dynamic change to at least one of a noise level, an interference level, a channel coefficient, a gain, or a combination thereof.

In a fourth aspect, alone or in combination with one or more of the first through third aspects, the indication includes information identifying an expiration of an occurrence of temporary cross-link interference for which the temporary resource change is to apply.

In a fifth aspect, alone or in combination with one or more of the first through fourth aspects, the temporary resource change includes a temporary time or frequency resource configuration, a temporary repetition configuration, or a combination thereof.

In a sixth aspect, alone or in combination with one or more of the first through fifth aspects, the indication is a UE-specific downlink control information.

In a seventh aspect, alone or in combination with one or more of the first through sixth aspects, the indication is a group-common downlink control information.

In an eighth aspect, alone or in combination with one or more of the first through seventh aspects, the indication is a medium access control (MAC) control element.

In a ninth aspect, alone or in combination with one or more of the first through eighth aspects, process 500 includes transmitting a radio resource control message including information identifying a time for an expiration of an occurrence of temporary cross-link interference for which the temporary resource change is to apply.

In a tenth aspect, alone or in combination with one or more of the first through ninth aspects, a time for an expiration of an occurrence of temporary cross-link interference for which the temporary resource change is to apply is defined in a standard.

In an eleventh aspect, alone or in combination with one or more of the first through tenth aspects, process 500 includes transmitting a radio resource control message to indicate one or more parameters of the temporary resource change to the UE.

In a twelfth aspect, alone or in combination with one or more of the first through eleventh aspects, transmitting the indication comprises transmitting the indication to cause a selection of at least one of the one or more parameters of the temporary resource change.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
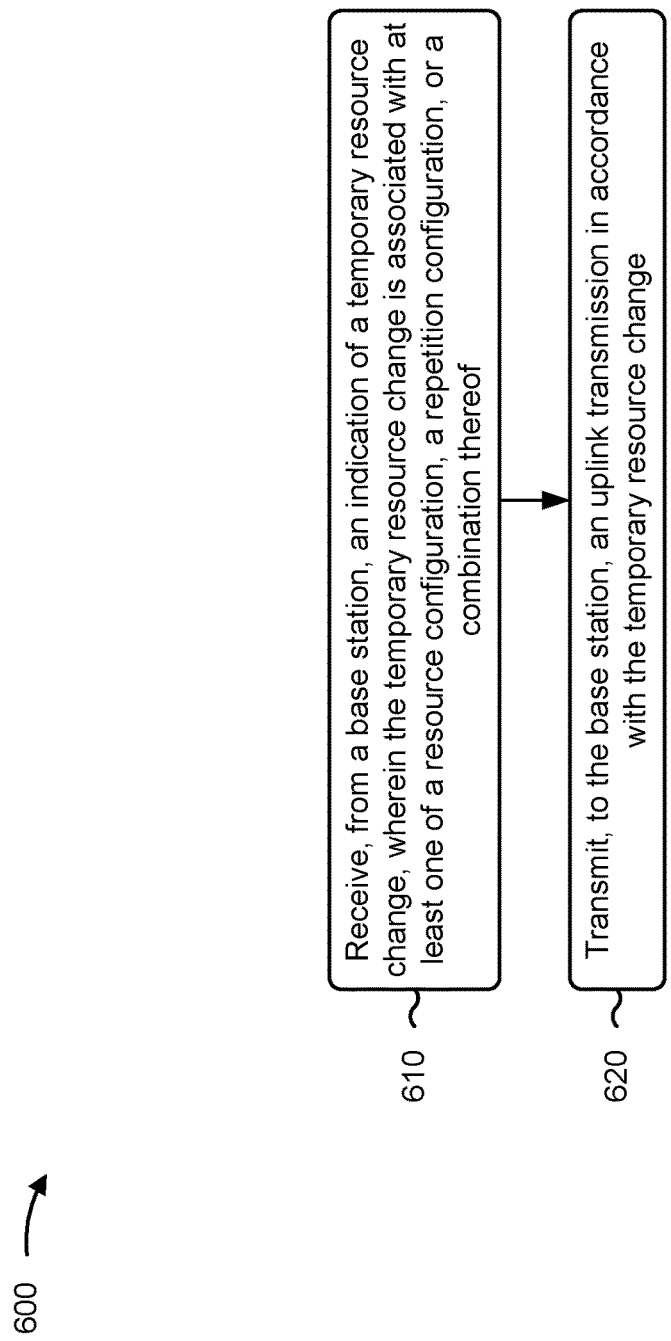
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with dynamic uplink adaptation.

As shown in FIG. 6, in some aspects, process 600 may include receiving, from a base station, an indication of a temporary resource change, wherein the temporary resource change is associated with at least one of a resource configuration, a repetition configuration, or a combination thereof (block 610). For example, the UE (e.g., using reception component 1002, depicted in FIG. 10) may receive, from a base station, an indication of a temporary resource change, wherein the temporary resource change is associated with at least one of a resource configuration, a repetition configuration, or a combination thereof, as described above.

As further shown in FIG. 6, in some aspects, process 600 may include transmitting, to the base station, an uplink transmission in accordance with the temporary resource change (block 620). For example, the UE (e.g., using transmission component 1004, depicted in FIG. 10) may transmit, to the base station, an uplink transmission in accordance with the temporary resource change, as described above.

Process 600 may include additional aspects, such as any single aspect or any combination of aspects described below and/or in connection with one or more other processes described elsewhere herein.

In a first aspect, the temporary resource change is the resource configuration.

In a second aspect, alone or in combination with the first aspect, the temporary resource change is the repetition configuration.

In a third aspect, alone or in combination with one or more of the first and second aspects, the temporary resource change is associated with a temporary, dynamic change to at least one of a noise level, an interference level, a channel coefficient, a gain, or a combination thereof.

In a fourth aspect, alone or in combination with one or more of the first through third aspects, the indication includes information identifying an expiration of an occurrence of temporary cross-link interference for which the temporary resource change is to apply.

In a fifth aspect, alone or in combination with one or more of the first through fourth aspects, the temporary resource change includes a temporary time or frequency resource configuration, a temporary repetition configuration, or a combination thereof.

In a sixth aspect, alone or in combination with one or more of the first through fifth aspects, the indication is a UE-specific downlink control information.

In a seventh aspect, alone or in combination with one or more of the first through sixth aspects, the indication is a group-common downlink control information.

In an eighth aspect, alone or in combination with one or more of the first through seventh aspects, the indication is a MAC control element.

In a ninth aspect, alone or in combination with one or more of the first through eighth aspects, process 600 includes receiving a radio resource control message including information identifying a time for an expiration of an occurrence of temporary cross-link interference for which the temporary resource change is to apply.

In a tenth aspect, alone or in combination with one or more of the first through ninth aspects, a time for an expiration of an occurrence of temporary cross-link interference for which the temporary resource change is to apply is defined in a standard.

In an eleventh aspect, alone or in combination with one or more of the first through tenth aspects, process 600 includes receiving a radio resource control message indicating one or more parameters of the temporary resource change to the UE.

In a twelfth aspect, alone or in combination with one or more of the first through eleventh aspects, process 600 includes selecting, based at least in part on the indication, at least one of the one or more parameters of the temporary resource change.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
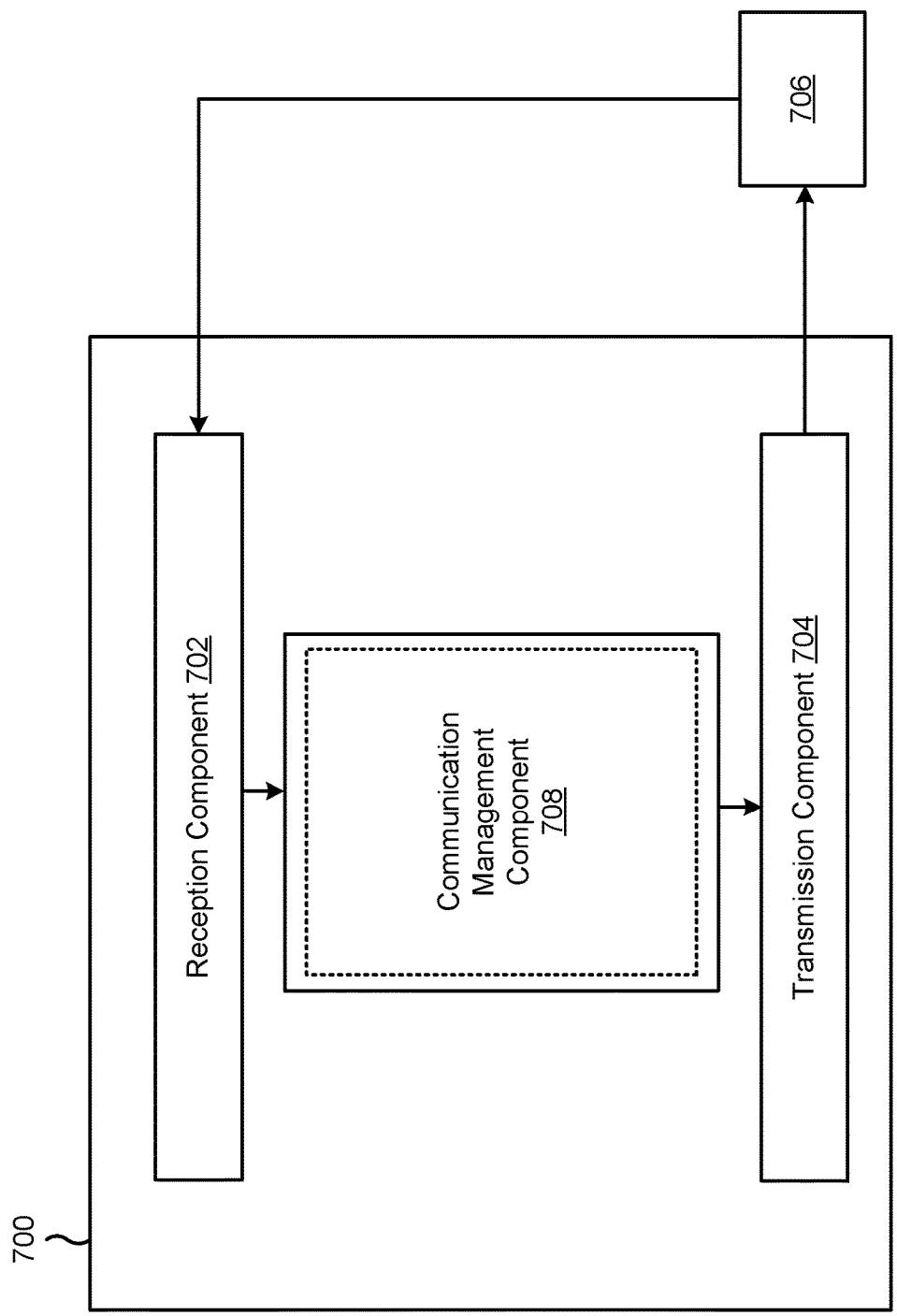
FIG. 7 is a diagram illustrating an example apparatus, in accordance with various aspects of the present disclosure.

FIG. 7 is a block diagram of an example apparatus 700 for wireless communication. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication management component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, among other examples. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The transmission component 704 may transmit, to a UE, an indication of a temporary resource change, wherein the temporary resource change is associated with at least one of a resource configuration, a repetition configuration, or a combination thereof. The reception component 702 may receive, from the UE, an uplink transmission in accordance with the temporary resource change. The transmission component 704 may transmit a radio resource control message including information identifying a time for an expiration of an occurrence of temporary cross-link interference for which the temporary resource change is to apply. The transmission component 704 may transmit a radio resource control message to indicate one or more parameters of the temporary resource change to the UE. The communication management component 708 may coordinate transmission by transmission component 704 and/or reception by reception component 702.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
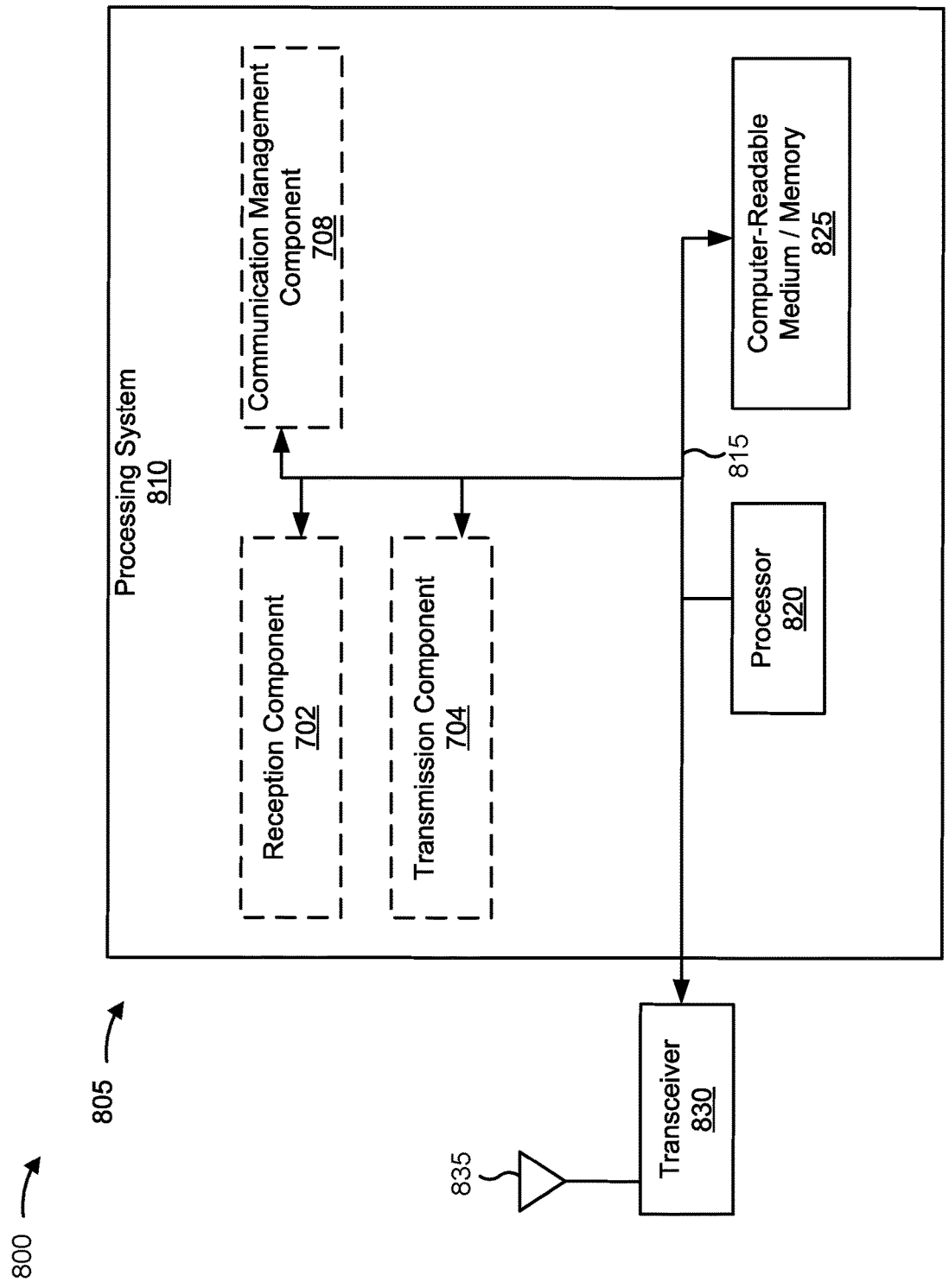
FIG. 8 is a diagram illustrating a hardware implementation of an example apparatus, in accordance with various aspects of the present disclosure.

FIG. 8 is a diagram illustrating an example 800 of a hardware implementation for an apparatus 805 employing a processing system 810. The apparatus 805 may be a BS.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, power management circuits, and/or the like.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 704, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer readable medium/memory 825, one or more hardware modules coupled to the processor 820, or some combination thereof.

In some aspects, the processing system 810 may be a component of the base station 110 and may include the memory 242 and/or at least one of the TX MIMO processor 230, the RX processor 238, and/or the controller/processor 240. In some aspects, the apparatus 805 for wireless communication includes means for transmitting an indication of a resource change or receiving an uplink transmission in accordance with the resource change, among other examples. The aforementioned means may be one or more of the aforementioned components of the apparatus 700 and/or the processing system 810 of the apparatus 805 configured to perform the functions identified with respect to the aforementioned means. As described elsewhere herein, the processing system 810 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 8 is provided as an example. Other examples may differ from what is described in connection with FIG. 8.

Figure 9:
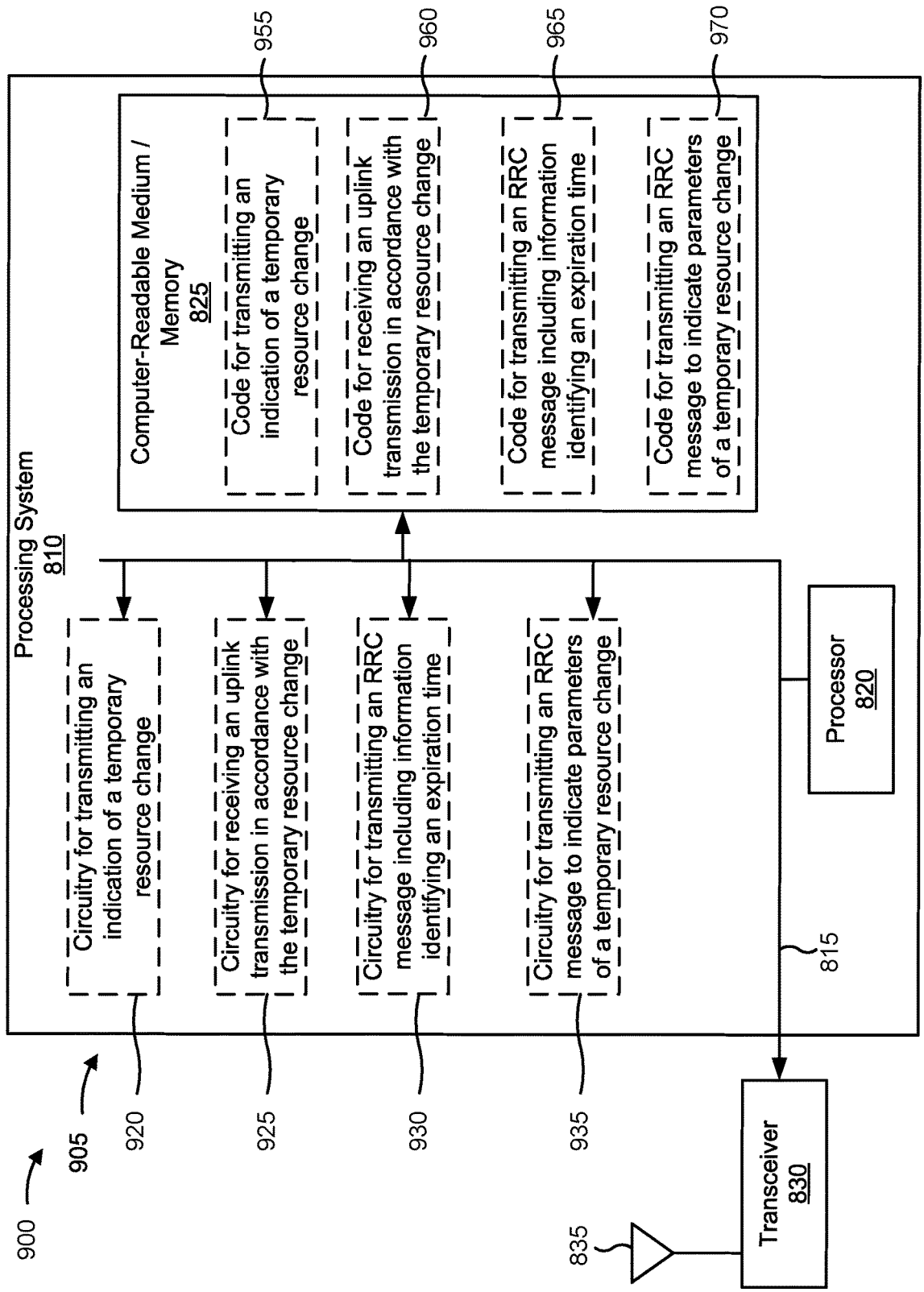
FIG. 9 is a diagram illustrating code and circuitry for an example apparatus, in accordance with various aspects of the present disclosure.

FIG. 9 is a diagram illustrating an example 900 of an implementation of code and circuitry for an apparatus 905. The apparatus 905 may be a UE, such as UE 120a among other examples.

As further shown in FIG. 9, the apparatus may include circuitry for transmitting an indication of a temporary resource change (circuitry 920). For example, the apparatus may include circuitry to enable the apparatus to transmit an indication of a temporary resource change.

As further shown in FIG. 9, the apparatus may include circuitry for receiving an uplink transmission in accordance with the temporary resource change (circuitry 925). For example, the apparatus may include circuitry to receive an uplink transmission in accordance with the temporary resource change.

As further shown in FIG. 9, the apparatus may include circuitry for transmitting an RRC message including information identifying an expiration time (circuitry 930). For example, the apparatus may include circuitry to enable the apparatus to transmit an RRC message including information identifying a time at which the temporary resource change is to expire.

As further shown in FIG. 9, the apparatus may include circuitry for transmitting an RRC message to indicate parameters of a temporary resource change (circuitry 935). For example, the apparatus may include circuitry to enable the apparatus to transmit an RRC message to indicate one or more parameters of a temporary resource change.

As further shown in FIG. 9, the apparatus may include, stored in computer-readable medium 825, code for transmitting an indication of a temporary resource change (code 955). For example, the apparatus may include code that, when executed by the processor 820, may cause the transceiver 830 to transmit an indication of a temporary resource change.

As further shown in FIG. 9, the apparatus may include, stored in computer-readable medium 825, code for receiving an uplink transmission in accordance with the temporary resource change (code 960). For example, the apparatus may include code that, when executed by the processor 820, may cause the transceiver 830 to receive an uplink transmission in accordance with the temporary resource change.

As further shown in FIG. 9, the apparatus may include, stored in computer-readable medium 825, code for transmitting an RRC message including information identifying an expiration time (code 965). For example, the apparatus may include code that, when executed by the processor 820, may cause the transceiver 830 to transmit an RRC message including information identifying an expiration time.

As further shown in FIG. 9, the apparatus may include, stored in computer-readable medium 825, code for transmitting an RRC message to indicate parameters of a temporary resource change (code 970). For example, the apparatus may include code that, when executed by the processor 820, may cause the transceiver 830 to transmit an RRC message to indicate parameters of a temporary resource change.

FIG. 9 is provided as an example. Other examples may differ from what is described in connection with FIG. 9.

Figure 10:
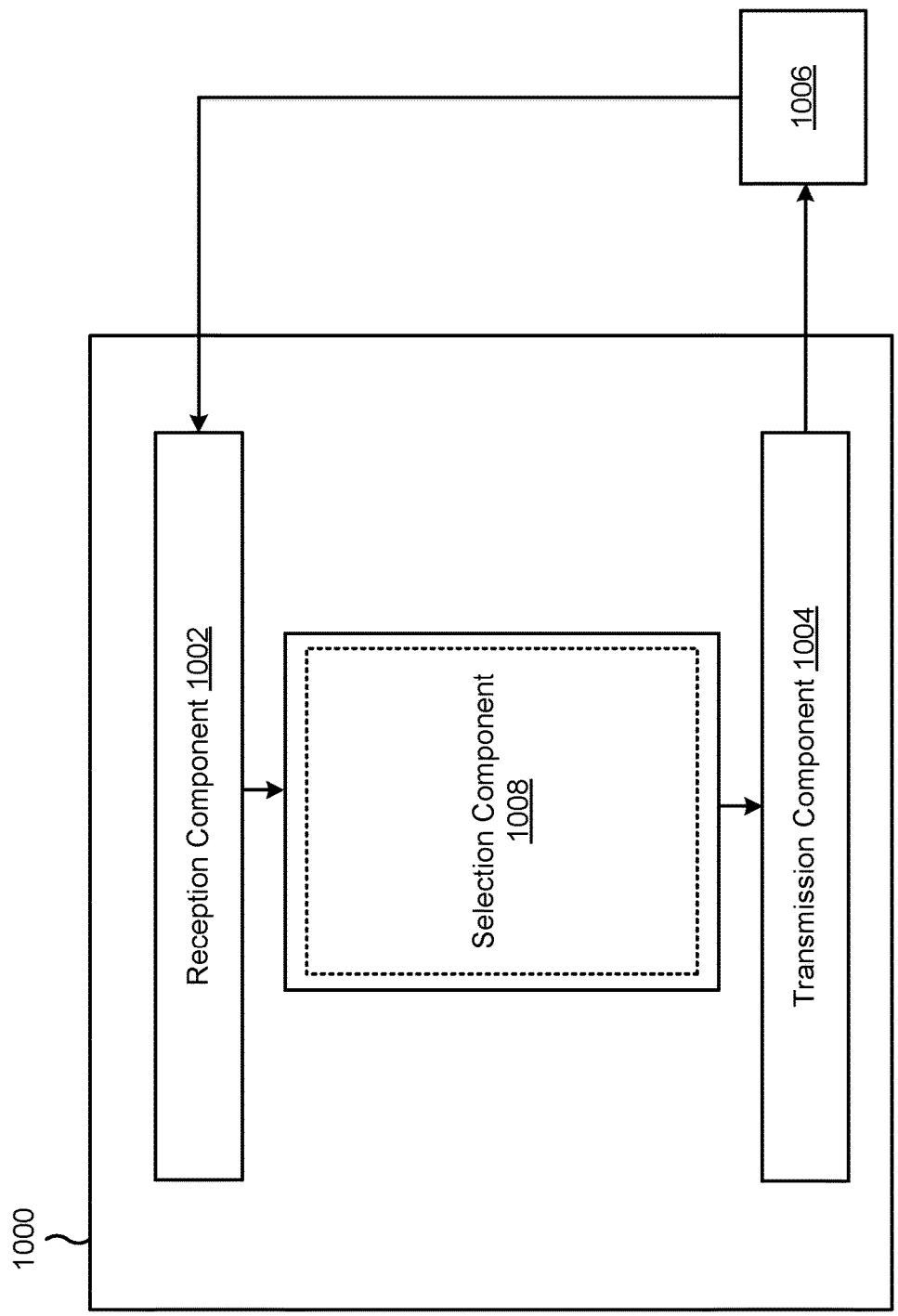
FIG. 10 is a diagram illustrating an example apparatus, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a selection component 1008, among other examples.

In some aspects, the apparatus 1000 may be configured to perform one or more operations described herein in connection with FIG. 4. Additionally, or alternatively, the apparatus 1000 may be configured to perform one or more processes described herein, such as process 600 of FIG. 6, among other examples. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a base station, an indication of a temporary resource change, wherein the temporary resource change is associated with at least one of a resource configuration, a repetition configuration, or a combination thereof. The transmission component 1004 may transmit, to the base station, an uplink transmission in accordance with the temporary resource change. The reception component 1002 may receive a radio resource control message including information identifying a time for an expiration of an occurrence of temporary cross-link interference for which the temporary resource change is to apply. The reception component 1002 may receive a radio resource control message indicating one or more parameters of the temporary resource change to the UE. The selection component may select at least one of the one or more parameters for the temporary resource change. In some aspects, the transmission component 1004 may include a transmit processor, a controller/processor, a receive processor, a memory, or a combination thereof, of the UE described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
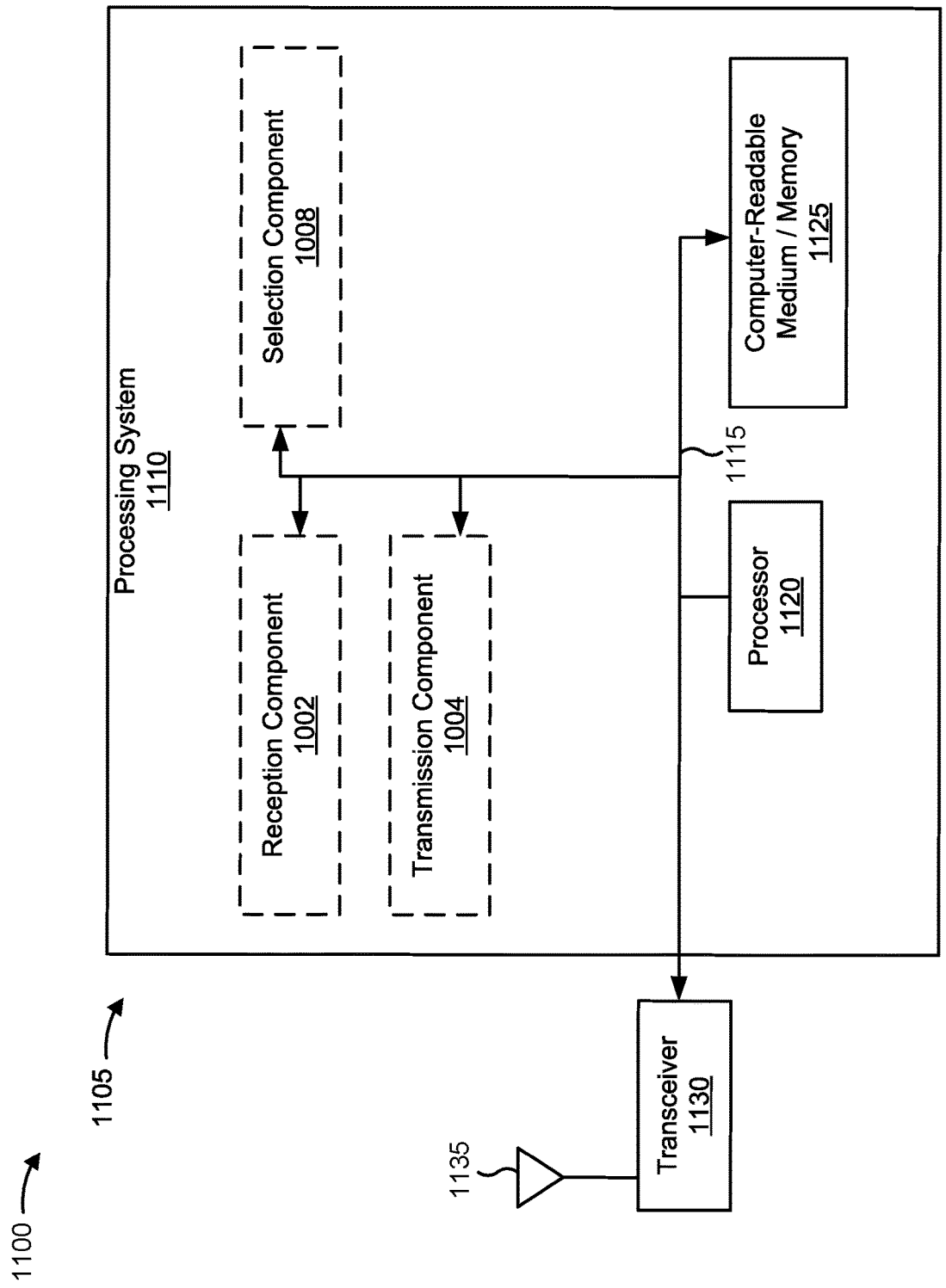
FIG. 11 is a diagram illustrating a hardware implementation of an example apparatus, in accordance with various aspects of the present disclosure.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for receiving an indication of a temporary resource change and/or means for transmitting an uplink transmission in accordance with the temporary resource change, among other examples. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
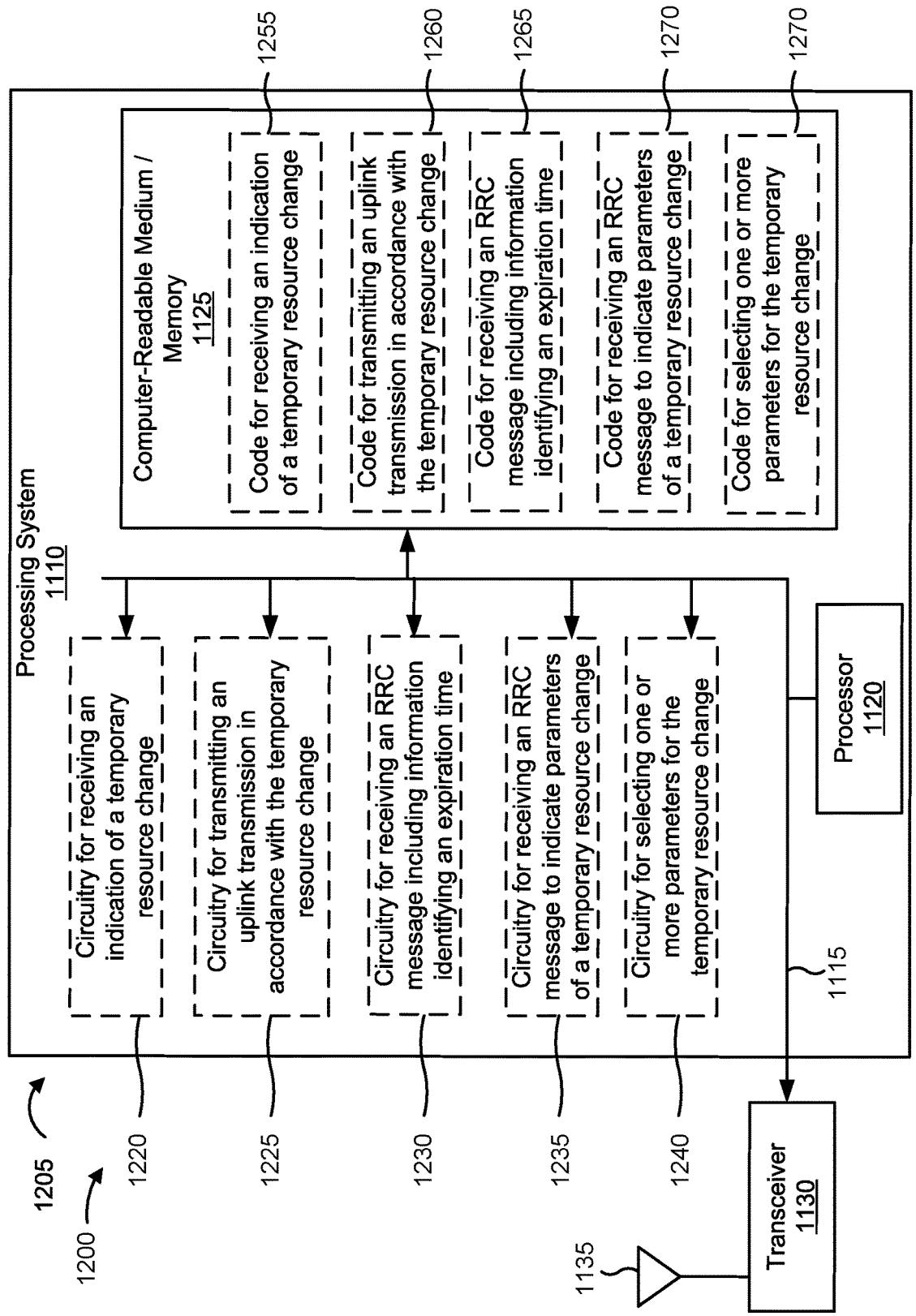
FIG. 12 is a diagram illustrating code and circuitry for an example apparatus, in accordance with various aspects of the present disclosure.

FIG. 12 is a diagram illustrating an example 1200 of an implementation of code and circuitry for an apparatus 1205. The apparatus 1205 may be a UE, such as UE 120a among other examples.

As further shown in FIG. 12, the apparatus may include circuitry for receiving an indication of a temporary resource change (circuitry 1220). For example, the apparatus may include circuitry to enable the apparatus to receive an indication of a temporary resource change.

As further shown in FIG. 12, the apparatus may include circuitry for transmitting an uplink transmission in accordance with the temporary resource change (circuitry 1225). For example, the apparatus may include circuitry to transmit an uplink transmission in accordance with the temporary resource change.

As further shown in FIG. 12, the apparatus may include circuitry for receiving an RRC message including information identifying an expiration time (circuitry 1230). For example, the apparatus may include circuitry to enable the apparatus to receive an RRC message including information identifying a time at which the temporary resource change is to expire.

As further shown in FIG. 12, the apparatus may include circuitry for receiving an RRC message to indicate parameters of a temporary resource change (circuitry 1235). For example, the apparatus may include circuitry to enable the apparatus to receive an RRC message to indicate one or more parameters of a temporary resource change.

As further shown in FIG. 12, the apparatus may include circuitry for selecting one or more parameters for the temporary resource change (circuitry 1240). For example, the apparatus may include circuitry to enable the apparatus to select one or more parameters for the temporary resource change.

As further shown in FIG. 12, the apparatus may include, stored in computer-readable medium 1125, code for receiving an indication of a temporary resource change (code 1255). For example, the apparatus may include code that, when executed by the processor 1120, may cause the transceiver 1130 to receive an indication of a temporary resource change.

As further shown in FIG. 12, the apparatus may include, stored in computer-readable medium 1125, code for transmitting an uplink transmission in accordance with the temporary resource change (code 1260). For example, the apparatus may include code that, when executed by the processor 1120, may cause the transceiver 1130 to transmit an uplink transmission in accordance with the temporary resource change.

As further shown in FIG. 12, the apparatus may include, stored in computer-readable medium 1125, code for receiving an RRC message including information identifying an expiration time (code 1265). For example, the apparatus may include code that, when executed by the processor 1120, may cause the transceiver 830 to receive an RRC message including information identifying an expiration time.

As further shown in FIG. 12, the apparatus may include, stored in computer-readable medium 1125, code for receiving an RRC message to indicate parameters of a temporary resource change (code 1270). For example, the apparatus may include code that, when executed by the processor 1120, may cause the transceiver 1130 to receive an RRC message to indicate parameters of a temporary resource change.

As further shown in FIG. 12, the apparatus may include, stored in computer-readable medium 1125, code for selecting one or more parameters for the temporary resource change (code 1270). For example, the apparatus may include code that, when executed by the processor 1120, may cause the transceiver 1130 to select one or more parameters for the temporary resource change.

FIG. 12 is provided as an example. Other examples may differ from what is described in connection with FIG. 12.

Figure 13:
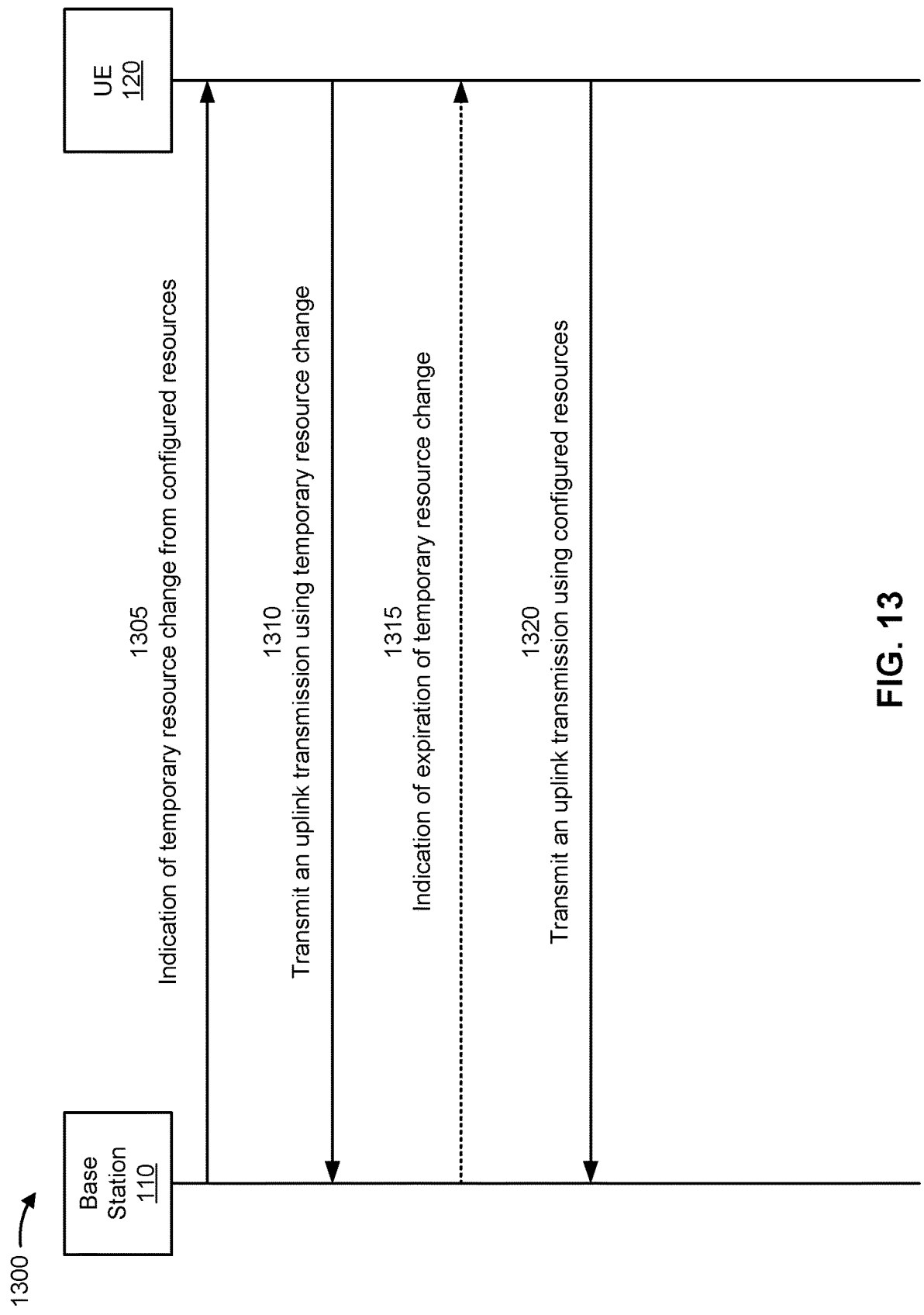
FIG. 13 is a diagram illustrating an example call flow diagram for dynamic uplink transmission adaptation, in accordance with various aspects of the present disclosure.

FIG. 13 is a diagram illustrating an example 1300 associated with dynamic uplink transmission adaptation, in accordance with various aspects of the present disclosure. As shown in FIG. 13, a base station 110 and a UE 120 may communicate with one another.

As show by reference number 1305, UE 120 may receive an indication of a temporary resource change from a configured set of resources. For example, UE 120 may receive dynamic signaling, such as a UE-specific DCI, a group-common DCI, or a MAC CE, among other examples, to trigger the temporary resource change. In some aspects, UE 120 may receive static signaling, such as an RRC message, configuring resources to use during the temporary resource change.

As shown by reference number 1310, UE 120 may transmit an uplink transmission using the temporary resource change. For example, based at least in part on triggering the temporary resource change, UE 120 may use additional time or frequency resources or a different quantity of repetitions (relative to a previous configured set of resources or repetitions), among other examples to transmit one or more uplink transmissions.

As shown by reference number 1315, UE 120 may, in some aspects, receive an indication of an expiration of the temporary resource change. For example, UE 120 may receive signaling, from base station 110, indicating that UE 120 is to stop using the temporary resource change for uplink transmission. Additionally, or alternatively, UE 120 may autonomously determine to stop using the temporary resource change. For example, UE 120 may determine that a timer associated with the temporary resource change has expired.

As shown in reference number 1320, UE 120 may transmit an uplink transmission using the configured set of resources. For example, UE 120 may return to a resource configuration used before the temporary resource change based at least in part on determining that the temporary resource change has expired.

As indicated above, FIG. 13 is provided as an example. Other examples may differ from what is described with respect to FIG. 13.

The following provides an overview of aspects of the present disclosure:

Aspect 1: A method of wireless communication performed by a base station (BS), comprising: transmitting, to a user equipment (UE), an indication of a temporary resource change, wherein the temporary resource change is associated with at least one of a resource configuration, a repetition configuration, or a combination thereof; and receiving, from the UE, an uplink transmission in accordance with the temporary resource change.

Aspect 2: The method of aspect 1, wherein the temporary resource change is the resource configuration.

Aspect 3: The method of aspect 1, wherein the temporary resource change is the repetition configuration.

Aspect 4: The method of any of aspects 1 to 3, wherein the temporary resource change is associated with a temporary, dynamic change to at least one of a noise level, an interference level, a channel coefficient, a gain, or a combination thereof.

Aspect 5: The method of any of aspects 1 to 4, wherein the indication includes information identifying an expiration of an occurrence of temporary cross-link interference for which the temporary resource change is to apply.

Aspect 6: The method of any of aspects 1 to 5, wherein the temporary resource change includes a temporary time or frequency resource configuration, a temporary repetition configuration, or a combination thereof.

Aspect 7: The method of any of aspects 1 to 6, wherein the indication is a UE-specific downlink control information.

Aspect 8: The method of any of aspects 1 to 6, wherein the indication is a group-common downlink control information.

Aspect 9: The method of any of aspects 1 to 6, wherein the indication is a medium access control (MAC) control element.

Aspect 10: The method of any of aspects 1 to 9, further comprising: transmitting a radio resource control message including information identifying a time for an expiration of an occurrence of temporary cross-link interference for which the temporary resource change is to apply.

Aspect 11: The method of any of aspects 1 to 9, wherein a time for an expiration of an occurrence of temporary cross-link interference for which the temporary resource change is to apply is defined in a standard.

Aspect 12: The method of any of aspects 1 to 11, further comprising: transmitting a radio resource control message to indicate one or more parameters of the temporary resource change to the UE.

Aspect 13: The method of aspect 12, wherein transmitting the indication comprises: transmitting the indication to cause a selection of at least one of the one or more parameters of the temporary resource change.

Aspect 14: A method of wireless communication performed by a user equipment (UE), comprising: receiving, from a base station, an indication of a temporary resource change, wherein the temporary resource change is associated with at least one of a resource configuration, a repetition configuration, or a combination thereof; and transmitting, to the base station, an uplink transmission in accordance with the temporary resource change.

Aspect 15: The method of aspect 14, wherein the temporary resource change is the resource configuration.

Aspect 16: The method of aspect 14, wherein the temporary resource change is the repetition configuration.

Aspect 17: The method of any of aspects 14 to 16, wherein the temporary resource change is associated with a temporary, dynamic change to at least one of a noise level, an interference level, a channel coefficient, a gain, or a combination thereof.

Aspect 18: The method of any of aspects 14 to 17, wherein the indication includes information identifying an expiration of an occurrence of temporary cross-link interference for which the temporary resource change is to apply.

Aspect 19: The method of any of aspects 14 to 18, wherein the temporary resource change includes a temporary time or frequency resource configuration, a temporary repetition configuration, or a combination thereof.

Aspect 20: The method of any of aspects 14 to 19, wherein the indication is a UE-specific downlink control information.

Aspect 21: The method of any of aspects 14 to 19, wherein the indication is a group-common downlink control information.

Aspect 22: The method of any of aspects 14 to 19, wherein the indication is a medium access control (MAC) control element.

Aspect 23: The method of any of aspects 14 to 22, further comprising: receiving a radio resource control message including information identifying a time for an expiration of an occurrence of temporary cross-link interference for which the temporary resource change is to apply.

Aspect 24: The method of any of aspects 14 to 22, wherein a time for an expiration of an occurrence of temporary cross-link interference for which the temporary resource change is to apply is defined in a standard.

Aspect 25: The method of any of aspects 14 to 24, further comprising: receiving a radio resource control message indicating one or more parameters of the temporary resource change to the UE.

Aspect 26: The method of aspect 25, wherein further comprising: selecting, based at least in part on the indication, at least one of the one or more parameters of the temporary resource change.

Aspect 27: An apparatus for wireless communication at a device, comprising a processor; memory coupled with the processor; and instructions stored in the memory and executable by the processor to cause the apparatus to perform the method of one or more aspects of aspects 1-26.

Aspect 28: A device for wireless communication, comprising a memory and one or more processors coupled to the memory, the memory and the one or more processors configured to perform the method of one or more aspects of aspects 1-13.

Aspect 29: An apparatus for wireless communication, comprising at least one means for performing the method of one or more aspects of aspects 1-13.

Aspect 30: A non-transitory computer-readable medium storing code for wireless communication, the code comprising instructions executable by a processor to perform the method of one or more aspects of aspects 1-13.

Aspect 31: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 32: An apparatus for wireless communication at a device, comprising a processor; memory coupled with the processor; and instructions stored in the memory and executable by the processor to cause the apparatus to perform the method of one or more aspects of aspects 1-13.

Aspect 33: A device for wireless communication, comprising a memory and one or more processors coupled to the memory, the memory and the one or more processors configured to perform the method of one or more aspects of aspects 14-26.

Aspect 34: An apparatus for wireless communication, comprising at least one means for performing the method of one or more aspects of aspects 14-26.

Aspect 35: A non-transitory computer-readable medium storing code for wireless communication, the code comprising instructions executable by a processor to perform the method of one or more aspects of aspects 14-26.

Aspect 36: A non-transitory computer-readable medium storing a set of instructions for wireless communication, the set of instructions comprising one or more instructions that, when executed by one or more processors of a device, cause the device to perform the method of one or more aspects of aspects 14-26.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication at a user equipment (UE), comprising:
    a memory; and
    one or more processors, coupled to the memory, configured to cause the UE to:
        receive an indication of a resource change,
            wherein the resource change is associated with at least one of a resource configuration or a repetition configuration,
            wherein the resource change is further associated with a dynamic change to one or more of a noise level, an interference level, a channel coefficient, or a gain, and
            wherein the resource change is for one or more of:
                a threshold amount of time, or
                a threshold quantity of one or more of symbols or slots; and
        transmit an uplink transmission in accordance with the resource change.

2. The apparatus of claim 1, wherein the resource change is for the threshold amount of time.

3. The apparatus of claim 1, wherein the resource change is for the threshold quantity of one or more of symbols or slots.

4. The apparatus of claim 1, wherein the dynamic change is to one or more of the noise level, the channel coefficient, or the gain.

5. The apparatus of claim 1, wherein, to receive the indication, the one or more processors are configured to cause the UE to:
    receive the indication from a network entity.

6. The apparatus of claim 5, wherein the network entity is a base station.

7. The apparatus of claim 1, wherein, to receive the indication, the one or more processors are configured to cause the UE to:
    receive the indication from a network entity.

8. The apparatus of claim 1, wherein the resource change is associated with the resource configuration.

9. The apparatus of claim 1, wherein the resource change is associated with the repetition configuration.

10. The apparatus of claim 1, wherein the indication includes information that identifies an expiration of an occurrence of cross-link interference for which the resource change is to apply.

11. The apparatus of claim 1, wherein the indication is one of:
    a UE-specific downlink control information,
    a group-common downlink control information, or
    a medium access control (MAC) control element.

12. The apparatus of claim 1, wherein the one or more processors are further configured to cause the UE to:
    receive a radio resource control message that includes information that identifies a time for an expiration of an occurrence of cross-link interference for which the resource change is to apply.

13. The apparatus of claim 1, wherein the one or more processors are further configured to cause the UE to:
    receive a radio resource control message that indicates one or more parameters of the resource change.

14. The apparatus of claim 1, wherein the one or more processors are further configured to cause the UE to:
    select, based at least in part on the indication, at least one of one or more parameters of the resource change.

15. A method of wireless communication performed at a user equipment (UE), comprising:
    receiving an indication of a resource change,
        wherein the resource change is associated with at least one of a resource configuration or a repetition configuration,
        wherein the resource change is further associated with a dynamic change to one or more of a noise level, an interference level, a channel coefficient, or a gain, and
        wherein the resource change is for one or more of:
            a threshold amount of time, or
            a threshold quantity of one or more of symbols or slots; and
    transmitting an uplink transmission in accordance with the resource change.

16. The method of claim 15, wherein the resource change is for the threshold amount of time.

17. The method of claim 15, wherein the resource change is for the threshold quantity of one or more of symbols or slots.

18. The method of claim 15, wherein the dynamic change is to one or more of the noise level, the channel coefficient, or the gain.

19. The method of claim 15, wherein the resource change is associated with the resource configuration.

20. The method of claim 15, wherein the resource change is associated with the repetition configuration.

21. An apparatus for wireless communication at a network entity, comprising:
    a memory; and
    one or more processors, coupled to the memory, configured to cause the network entity to:
        transmit an indication of a resource change,
            wherein the resource change is associated with at least one of a resource configuration or a repetition configuration,
            wherein the resource change is further associated with a dynamic change to one or more of a noise level, an interference level, a channel coefficient, or a gain, and
            wherein the resource change is for one or more of:
                a threshold amount of time, or
                a threshold quantity of one or more of symbols or slots; and
        receive an uplink transmission in accordance with the resource change.

22. The apparatus of claim 21, wherein the resource change is for the threshold amount of time.

23. The apparatus of claim 21, wherein the resource change is for the threshold quantity of one or more of symbols or slots.

24. The apparatus of claim 21, wherein the dynamic change is to one or more of the noise level, the channel coefficient, or the gain.

25. The apparatus of claim 21, wherein the network entity is a base station.

26. A method of wireless communication performed at a network entity, comprising:
  transmitting an indication of a resource change,
    wherein the resource change is associated with at least one of a resource configuration or a repetition configuration,
    wherein the resource change is further associated with a dynamic change to one or more of a noise level, an interference level, a channel coefficient, or a gain, and
    wherein the resource change is for one or more of:
      a threshold amount of time, or
      a threshold quantity of one or more of symbols or slots; and
  receiving an uplink transmission in accordance with the resource change.

27. The method of claim 26, wherein the resource change is for the threshold amount of time.

28. The method of claim 26, wherein the dynamic change is to one or more of the noise level, the channel coefficient, or the gain.

29. The method of claim 26, wherein the resource change is for the threshold quantity of one or more of symbols or slots.

30. A non-transitory computer-readable medium storing a set of instructions for wireless communication, the set of instructions comprising:
  one or more instructions that, when executed by one or more processors of a user equipment (UE), cause the UE to:
    receive an indication of a resource change,
      wherein the resource change is associated with at least one of a resource configuration or a repetition configuration,
      wherein the resource change is further associated with a dynamic change to one or more of a noise level, an interference level, a channel coefficient, or a gain, and
      wherein the resource change is for one or more of:
        a threshold amount of time, or
        a threshold quantity of one or more of symbols or slots; and
    transmit an uplink transmission in accordance with the resource change.

31. The non-transitory computer-readable medium of claim 30, wherein the resource change is for the threshold amount of time.

32. The non-transitory computer-readable medium of claim 30, wherein the resource change is for the threshold quantity of one or more of symbols or slots.

33. The non-transitory computer-readable medium of claim 30, wherein the dynamic change is to one or more of the noise level, the channel coefficient, or the gain.

34. A non-transitory computer-readable medium storing a set of instructions for wireless communication, the set of instructions comprising:
  one or more instructions that, when executed by one or more processors of a network entity, cause the network entity to:
    transmit an indication of a resource change,
      wherein the resource change is associated with at least one of a resource configuration or a repetition configuration,
      wherein the resource change is further associated with a dynamic change to one or more of a noise level, an interference level, a channel coefficient, or a gain, and
      wherein the resource change is for one or more of:
        a threshold amount of time, or
        a threshold quantity of one or more of symbols or slots; and
    receive an uplink transmission in accordance with the resource change.

35. The non-transitory computer-readable medium of claim 34, wherein the resource change is for the threshold amount of time.

36. The non-transitory computer-readable medium of claim 34, wherein the resource change is for the threshold quantity of one or more of symbols or slots.

37. The non-transitory computer-readable medium of claim 34, wherein the dynamic change is to one or more of the noise level, the channel coefficient, or the gain.

38. An apparatus for wireless communication, comprising:
  means for receiving an indication of a resource change,
    wherein the resource change is associated with at least one of a resource configuration or a repetition configuration,
    wherein the resource change is further associated with a dynamic change to one or more of a noise level, an interference level, a channel coefficient, or a gain, and
    wherein the resource change is for one or more of:
      a threshold amount of time, or
      a threshold quantity of one or more of symbols or slots; and
  means for transmitting an uplink transmission in accordance with the resource change.

39. The apparatus of claim 38, wherein the resource change is for the threshold amount of time.

40. The apparatus of claim 38, wherein the resource change is for the threshold quantity of one or more of symbols or slots.

41. The apparatus of claim 38, wherein the dynamic change is to one or more of the noise level, the channel coefficient, or the gain.

42. An apparatus for wireless communication, comprising:
  means for transmitting an indication of a resource change,
    wherein the resource change is associated with at least one of a resource configuration or a repetition configuration,
    wherein the resource change is further associated with a dynamic change to one or more of a noise level, an interference level, a channel coefficient, or a gain, and
    wherein the resource change is for one or more of:
      a threshold amount of time, or
      a threshold quantity of one or more of symbols or slots; and
  means for receiving an uplink transmission in accordance with the resource change.

43. The apparatus of claim 42, wherein the resource change is for the threshold amount of time.

44. The apparatus of claim 42, wherein the resource change is for the threshold quantity of one or more of symbols or slots.

45. The apparatus of claim 42, wherein the dynamic change is to one or more of the noise level, the channel coefficient, or the gain.

* * * * *